US011482142B2

(12) United States Patent
Vlachos

(10) Patent No.: US 11,482,142 B2
(45) Date of Patent: Oct. 25, 2022

(54) LIGHT LEAK CORRECTION FOR MIXED REALITY DEVICES

(71) Applicant: Microsoft Technology Licensing, LLC, Redmond, WA (US)

(72) Inventor: Alexander C. Vlachos, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/083,024

(22) Filed: Oct. 28, 2020

(65) Prior Publication Data
US 2022/0130297 A1 Apr. 28, 2022

(51) Int. Cl.
G09G 3/00 (2006.01)
G06T 7/00 (2017.01)
G09G 3/36 (2006.01)

(52) U.S. Cl.
CPC ........... G09G 3/006 (2013.01); G06T 7/0004 (2013.01); G09G 3/3607 (2013.01); G06T 2207/10024 (2013.01); G06T 2207/30121 (2013.01); G09G 2320/0242 (2013.01); G09G 2320/0257 (2013.01); G09G 2330/12 (2013.01); G09G 2354/00 (2013.01); G09G 2360/145 (2013.01)

(58) Field of Classification Search
None
See application file for complete search history.

(56) References Cited

U.S. PATENT DOCUMENTS

2006/0132511 A1 6/2006 Feng
2010/0002027 A1* 1/2010 Krijn ................. G09G 3/342
                                            345/694
2018/0074578 A1* 3/2018 Robbins ............. G06T 11/60
2019/0182440 A1* 6/2019 Xin .................... G01J 3/10
2020/0043441 A1* 2/2020 Kim ................. G09G 3/3607
2021/0065622 A1* 3/2021 Chu ................... G09G 3/20

FOREIGN PATENT DOCUMENTS

EP 1288906 A2 3/2003

OTHER PUBLICATIONS

"International Search Report and Written Opinion Issued in PCT Application No. PCT/US21/043257", dated Nov. 2, 2021, 16 Pages.

* cited by examiner

Primary Examiner — Christopher R Lamb
(74) Attorney, Agent, or Firm — Workman Nydegger

(57) ABSTRACT

Systems are configured for facilitating light leak correction for a display device. The systems are configured to obtain a color value for a pixel and obtain a light leak value associated with the pixel. The light leak value is based on a measured light leakage associated with a color filter of a display device configured to display the pixel. Systems are also configured to generate an updated color value for the pixel by applying a light leak compensation operation to the color value for the pixel. The light leak compensation operation uses the light leak value as an input for modifying the color value to compensate for light leakage that may otherwise occur when displaying the pixel on the display device. Systems are also configured to trigger display of the pixel on the display device using the updated color value.

15 Claims, 7 Drawing Sheets

LIGHT LEAK CORRECTION FOR MIXED REALITY DEVICES

BACKGROUND

Many display systems include display panels that comprise a collection of pixels for displaying image content to users. Some display systems, such as liquid crystal displays (LCDs), utilize one or more back lighting elements that emit white light in conjunction with color filters to display a colored image. For example, different pixels of an LCD may each comprise a respective set of color filters, with each color filter being associated with a different color channel (e.g., a red channel, green channel, or blue channel, according to the RGB color model). In this way, each pixel may be configured to display different color values (e.g., different brightness levels of red light, green light, or blue light, according to the RGB color model).

Color filters implemented on LCD screens or panels often operate in an imperfect manner. For example, a color filter of a pixel configured to transmit green light (e.g., for a green color channel) may fail to filter out all red light and may consequently transmit some red light therethrough. The transmission of light through a color filter associated with an unintended color or color channel is referred to herein as "light leakage".

Light leakage may manifest in various ways to users and may result in undesired user experiences. For example, light leakage may result in color tinting, where images presented on a display include colors that differ from those expected based on pixel color values provided to the display. In some instances, light leakage causes image ghosting artifacts, especially for devices or instances in which one or more optical elements intervene between display panels/screens and an observer (e.g., a user's eye or another image detector/sensor). For example, image ghosting may occur on head-mounted displays (HMDs) configured that include display panels and optics configured to refract light emitted by the display panels toward a user's eye.

Thus, for at least the foregoing reasons, there is an ongoing need and desire for techniques for correcting or compensating for light leakage that may be caused by color filters of display systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for facilitating light leak correction for display devices.

Some embodiments include computer-executable instructions that are executable by a system to configure the system to perform methods associated with various acts, including an act of obtaining a color value for a pixel and an act of obtaining a light leak value associated with the pixel. The light leak value is based on a measured light leakage associated with a color filter of a display device configured to display the pixel. Such methods also include, in some instances, an act of generating an updated color value for the pixel by applying a light leak compensation operation to the color value for the pixel. The light leak compensation operation uses the light leak value as an input for modifying the color value to compensate for light leakage that may otherwise occur when displaying the pixel on the display device. The disclosed methods may also include an act of triggering display of the pixel on the display device using the updated color value.

Some embodiments include computer-executable instructions that are executable by a system to configure the system to perform methods associated with various acts, including an act of capturing, with an image detector, a test image of a pixel displayed by a display device. The display device displays the pixel using a particular color value, and the particular color value includes at least three component values associated, respectively, with at least three different color channels. Each different color channel is associated with a different color filter of the display device. In some instances, the disclosed methods also include an act of detecting, within the test image, a representation of the pixel displayed by the display device that includes an image color value, where the image color value represents component values that differ from corresponding component values for the pixel displayed by the display device. These methods may also include an act of generating a light leak value based on the image color value, wherein the light leak value is used to adjust subsequent color values for display on one or more display devices.

Some embodiments include computer-executable instructions that are executable by a system to configure the system to perform methods associated with various acts, including an act of displaying a pixel on a display device, where the pixel is displayed with a color value and using a color filter of the display device. The color filter is associated with a particular color channel. A light leak value associated with the color filter used to display the pixel with the color value is also identified and applied as an input for generating a subsequent color value for the pixel, and displaying the pixel on the display device using the subsequent color value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
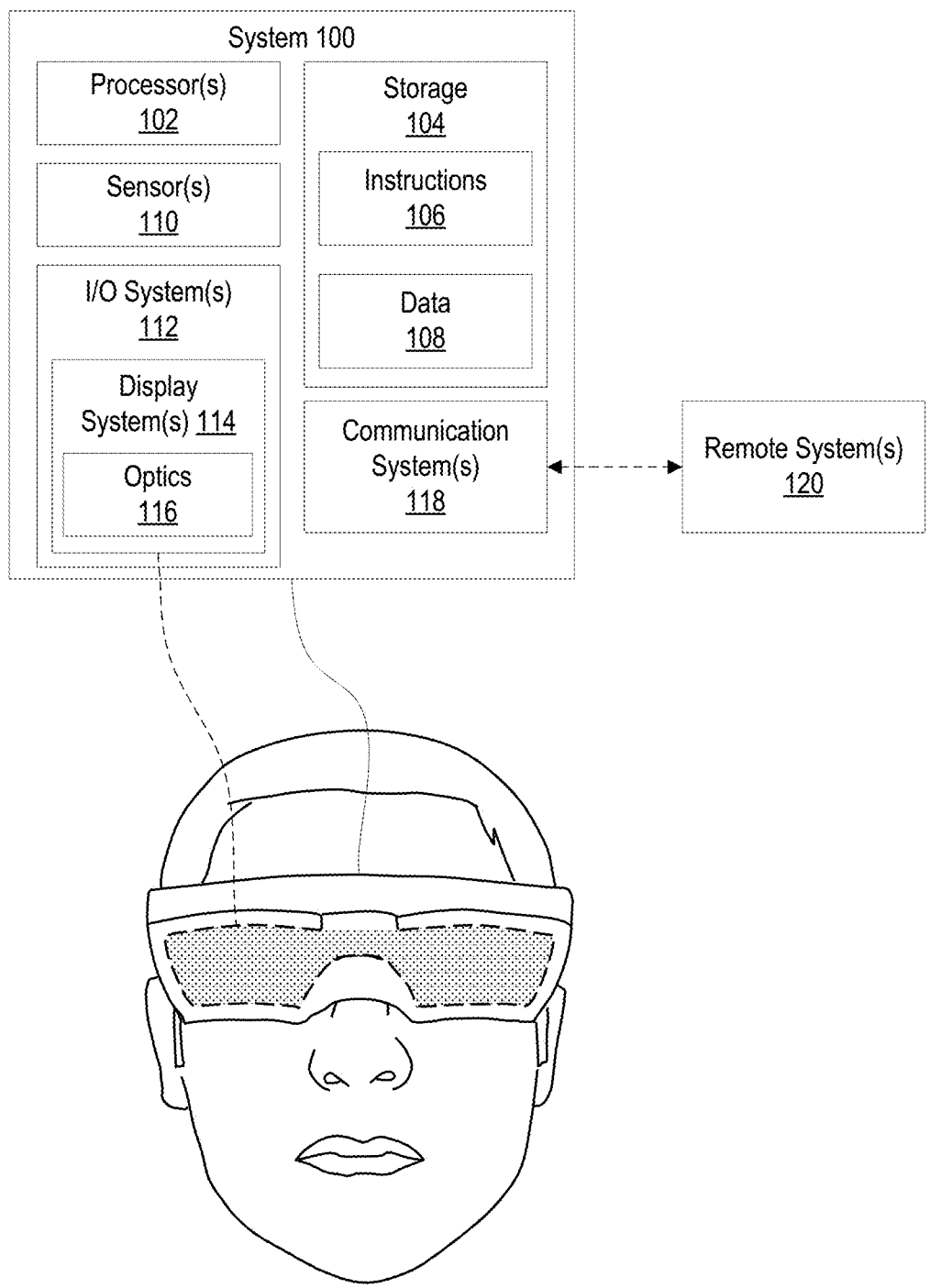
FIG. 1 illustrates an example system that may include or be used to implement one or more disclosed embodiments.

Disclosed embodiments are generally directed to systems and methods for facilitating light leak correction for display devices.

Examples of Technical Benefits, Improvements, and Practical Applications

Those skilled in the art will recognize, in view of the present disclosure, that at least some of the disclosed embodiments may be implemented to address various shortcomings associated with at least some conventional display systems that utilize color filters. The following section outlines some example improvements and/or practical applications provided by the disclosed embodiments. It will be appreciated, however, that the following are examples only and that the embodiments described herein are in no way limited to the example improvements discussed herein.

In some implementations, a light leak value may be measured for one or more color filters of a pixel of a display system (e.g., an LCD system). The light leak value may quantify an amount of unintended or undesired light that leaks through a color filter. For example, for a green color filter, the light leak value may be represented as a percentage of red or blue light that transmits through the green color filter.

With access to a light leak value, a system may obtain a color value that is to be presented by a pixel of a display system (e.g., whether the same pixel for which the light leak value was measured, a different pixel of the same display, or any pixel of a different display). The system may then utilize the light leak value in a light leak compensation operation to generate an updated color value for presentation by the pixel. In some instances, the light leak compensation operation may be thought of as a subtraction operation that subtracts from brightness values associated with color channels of the color value to generate an updated color value that accounts for light leakage that will occur through one or more color filters associated with the color channels.

For example, where a percentage of red light leaks through a green color filter, a light leak compensation operation may involve calculating a product of the percentage of red light leakage and the brightness value for the green color channel, and subtracting the product from the brightness value for the red color channel. The system may then cause the pixel to display the updated color value, and the updated color value may compensate for light leakage that may have otherwise occurred.

These and other techniques described herein for measuring light leakage and/or compensating for light leakage may address artifacts caused by light leakage that may degrade user experiences. For example, in some instances, compensating for light leakage as disclosed herein may ameliorate or eliminate color tinting artifacts that would otherwise cause image colors perceived through a display to deviate from expected color values provided to the display. As another example, in some instances, compensating for light leakage as disclosed herein may ameliorate or eliminate image ghosting artifacts that would otherwise cause perceptibly offset and off-color representations of virtual content.

Having just described some of the various high-level features and benefits of the disclosed embodiments, attention will now be directed to FIGS. 1 through 7. These Figures illustrate various conceptual representations, architectures, methods, and supporting illustrations related to the disclosed embodiments.

Example Systems and Techniques for Light Leak Correction

Attention is now directed to FIG. 1, which illustrates an example system 100 that may include or be used to implement one or more disclosed embodiments. FIG. 1 depicts the system 100 as a head-mounted display (HMD) configured for placement over a head of a user to display virtual content for viewing by the user's eyes. Such an HMD may comprise a virtual reality (VR) system or any other type of HMD. Although the present disclosure focuses, in at least some respects, on a system 100 implemented as a VR HMD, it should be noted that at the techniques described herein for compensating for light leakage may be implemented wherever light leakage is caused by color filters of a display system.

FIG. 1 illustrates various example components of the system 100. For example, FIG. 1 illustrates an implementation in which the system includes processor(s) 102, storage 104, sensor(s) 110, I/O system(s) 112, and communication system(s) 118. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 118 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with facilitating light leak correction for a display device. The actions may rely at least in part on data 108 (e.g., light leak values, color values, etc.) stored on storage 104 in a volatile or non-volatile manner.

In some instances, the actions may rely at least in part on communication system(s) 118 for receiving data from remote system(s) 120, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

Furthermore, FIG. 1 illustrates that a system 100 may comprise or be in communication with a I/O system(s) 112. I/O system(s) 112 may include any type of input or output device such as, by way of non-limiting example, a touch screen, a mouse, a keyboard, a controller, and/or others, without limitation. FIG. 1 illustrates an implementation in which the I/O system(s) 112 include(s) display system(s) 114. According to the present disclosure, the display system(s) 114 may comprise any type of hardware device that uses one or more color filters to form images for viewing by an image detector or sensor (e.g., a camera and/or an eye of a user). Such color filters may be associated with pixels of a display panel, where the pixels are configurable to present different color values.

FIG. 1 also illustrates that, in some implementations, the display system(s) 114 may include optics 116 that may be configured to refract light emitted by display panels of the display system(s) 114. For example, such optics 116 may be present in display system(s) 114 of a VR HMD, as depicted in FIG. 1.

Figure 2:
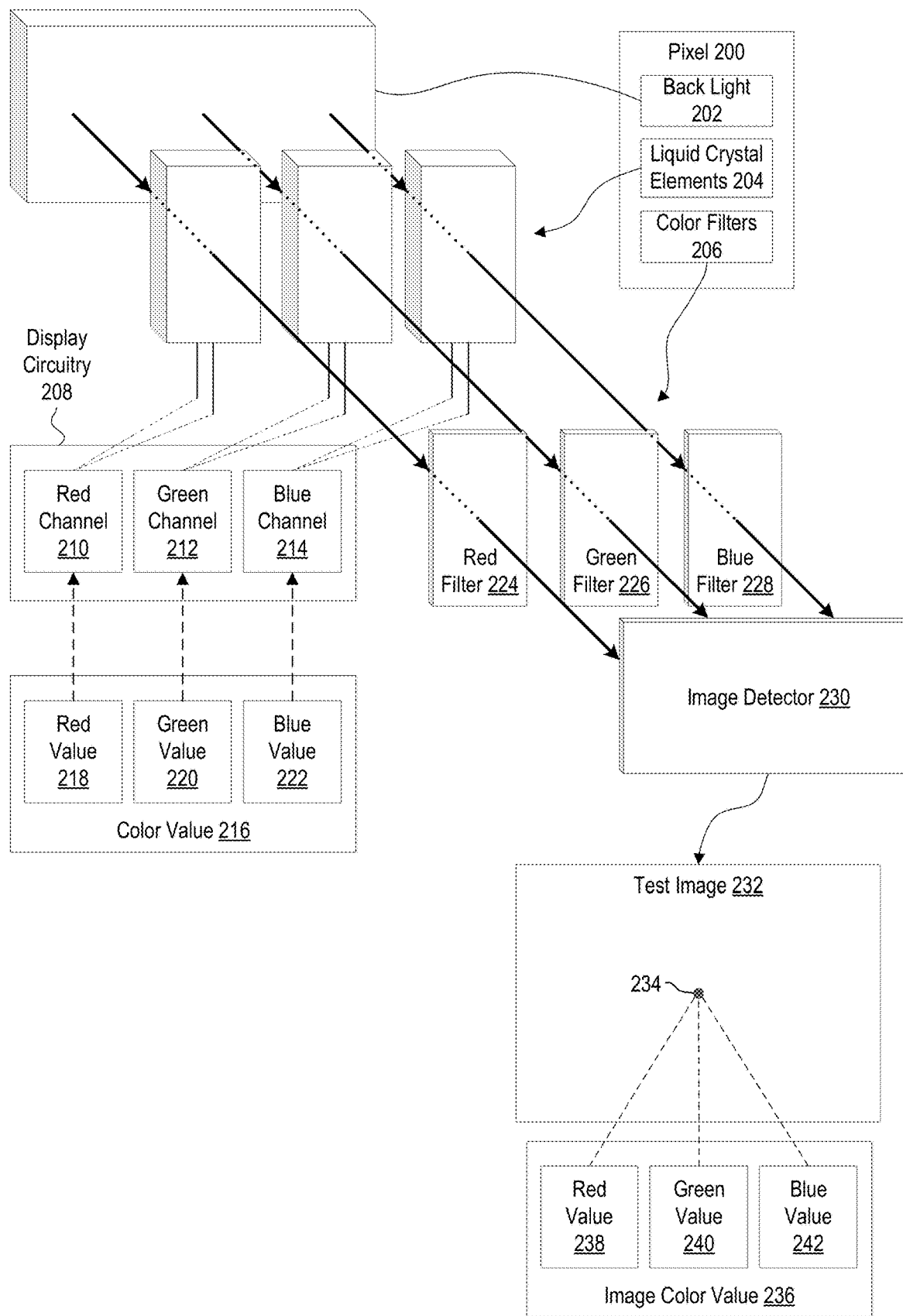
FIG. 2 illustrates an example pixel configured to display a color value to an image detector.

Attention is now directed to FIG. 2, which illustrates an example pixel 200 configured to display a color value to an image detector. In some instances, the pixel 200 may be one of several pixels of a display panel of display system(s) 114 (e.g., an LCD panel). In this regard, the pixel 200 may be configured to present different color values to form an image (e.g., in combination with other pixels) for viewing by an image detector.

To facilitate such functionality, the pixel 200 may comprise and/or be generated from various components. For instance, FIG. 2 illustrates the pixel 200 as comprising and/or being generated from a back light 202, liquid crystal elements 204, and color filters 206. The pixel 200 may comprise and/or be generated from other components as well, although not explicitly shown in FIG. 2, such as polarizers, glass layers, and/or conductive layers.

The back light 202 may be configured to emit white light (e.g., comprising substantially all wavelengths within the visible spectrum) toward various liquid crystal elements 204, as indicated in FIG. 2 by the arrows extending from the back light 202 toward the liquid crystal elements 204. The liquid crystal elements 204 may be configured to selectively transmit light therethrough toward the color filters 206, as indicated in FIG. 2 by the arrows extending from the liquid crystal elements 204 toward respective color filters 206. The various color filters 206 may be configured to transmit light of a predetermined color for viewing by an image detector (e.g., image detector 230), as indicated by the arrows in FIG. 2 extending from the various color filters 206.

FIG. 2 illustrates one liquid crystal element 204 associated with a red filter 224, a second liquid crystal element 204 associated with a green filter 226, and a third liquid crystal element 204 associated with a blue filter 228 (e.g., according to the red, green, blue (RGB) color model). In this way, the amount of white light selectively transmitted by the liquid crystal elements 204 may affect the amount of red, green, or blue light transmitted through the color filters 206 and output by the pixel 200 for viewing by an image detector. The pixel 200 may operate in conjunction with other pixels to display images.

The liquid crystal elements 204 may be controllable via display circuitry 208 to control the amount of light selectively transmitted toward the color filters 206. For instance, the display circuitry 208 may selectively provide currents through the different liquid crystal elements 204 to cause liquid crystals of the liquid crystal elements 204 to align in a manner that allows light to transmit therethrough. The amount of light permitted to transmit through the liquid crystal elements 204 may be controlled by the amount of current provided to the liquid crystal elements 204 by the display circuitry 208.

The display circuitry 208 may be configured to control the different liquid crystal elements 204 according to different color channels. For example, FIG. 2 conceptually represents the display circuitry 208 as being associated with a red channel 210, a green channel 212, and a blue channel 214, according to the RGB color model. FIG. 2 also depicts that the red channel 210 controls current flow to the liquid crystal element 204 that is associated with the red filter 224, the green channel 212 controls current flow to the liquid crystal element 204 associated with the green filter 226, and the blue channel 214 controls current flow to the liquid crystal element 204 associated with the blue filter 228. In this way, the display circuitry 208 may selectively provide separate currents to separate liquid crystal elements 204 according to different color channels (e.g., the red channel 210, the green channel 212, and the blue channel 214) cause separate amounts of white light to be transmitted toward the color filters 206 and to thereby achieve desired levels (e.g., brightness levels) of different colors (e.g., red, green, and blue) for the pixel 200.

The amount of current provided to the liquid crystal elements 204 via the display circuitry 208 (e.g., according to the different color channels) may be determined by a color value 216 provided to the display circuitry. In some implementations, the color value 216 may be obtained by or provided to the display circuitry 208 from a frame buffer (e.g., written in storage 104 in volatile manner by processor(s) 102, such as a graphics processing unit (GPU)). The color value 216 may comprise various component values associated with the different color channels. For instance, FIG. 2 illustrates that the color value 216 includes a red value 218, a green value 220, and a blue value 222, which are associated, respectively, with the red channel 210, green channel 212, and blue channel 214. For example, the red value 218 may comprise a numerical value (e.g., within a range of 0 to 255) that determines the amount of current that the display circuitry 208 provides to the liquid crystal element 204 associated with the red filter 224 according to the red channel 210, the green value 220 may comprise a numerical value that determines the amount of current that the display circuitry 208 provides to the liquid crystal element 204 associated with the green filter 226 according to the green channel 212, and the blue value 222 may comprise a numerical value that determines the amount of current that the display circuitry 208 provides to the liquid crystal element 204 associated with the blue filter 228 according to the blue channel 214.

According to the foregoing, the pixel 200 of a display system 114 may be configurable to transmit separate amounts of light through the color filters 206 associated with different color channels to provide various composite color outputs, according to the color value 216.

However, as noted above, color filters 206 of many display systems 114 (e.g., LCD systems) may fail to operate in an optimal manner and may cause light leakage, as defined hereinabove. For example, light transmitted through the green filter 226 (indicated in FIG. 2 by the arrow extending therefrom toward the image detector 230) may comprise green light and at least some red light, and/or light transmitted through the blue filter 228 (indicated in FIG. 2 by the arrow extending therefrom toward the image detector 230) may comprise blue light and at least some green light.

To illustrate, FIG. 2 shows an image detector 230 observing/detecting light transmitted through the color filters 206 of the pixel 200 when the pixel 200 is configured to display a color according to a particular color value 216. The image detector 230 may comprise any type of image sensor, such as a camera device or human eye. The image detector 230 may capture or observe a test image 232 that includes a representation 234 of the pixel 200 displaying the color value 216. The representation 234 of the pixel 200 displaying the color value 216, as captured/observed within the test image 232 may be associated with an image color value 236 comprising a red value 238, green value 240, and a blue value 242.

In some instances, because of light leakage, image color value 236 of the representation 234 of the pixel 200 captured or observed within the test image 232 may differ from the color value 216 initially provided for display by the pixel 200. For instance, where the green filter 226 leaks red light and the blue filter 228 leaks green light, as noted in a previous example, the red value 238 and the green value 240 of the image color value 236 as represented in the test image 232 may be higher than the red value 218 and the green value 220 of the color value 216 initially provided for display by the pixel 200. Thus, color tinting may be evident to users observing the pixel 200 displaying the color value 216, which may cause the pixel 200 to appear with more red or green color content than desired or intended.

Figure 3:
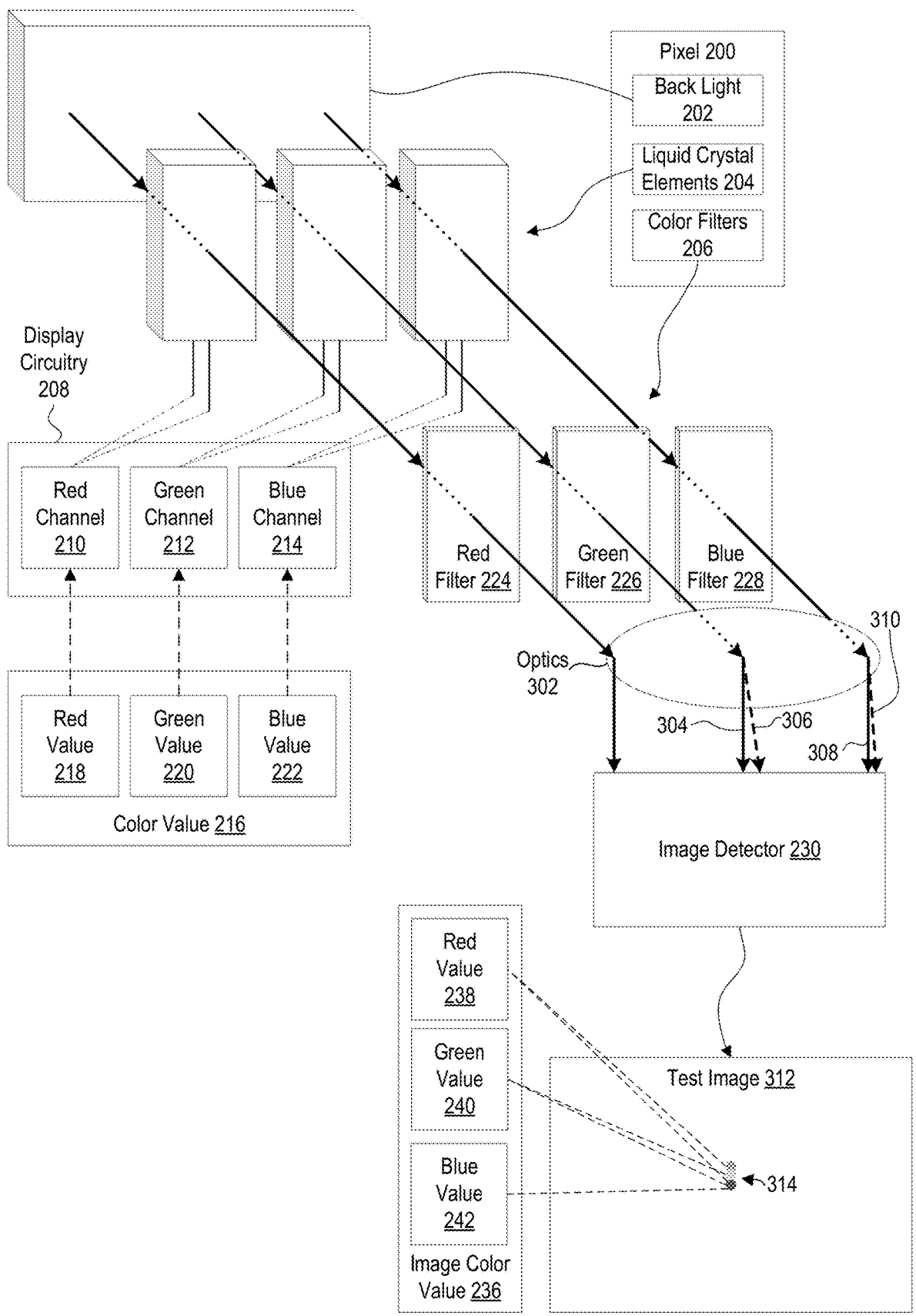
FIG. 3 illustrates an example pixel configured to display a color value to an image detector, where one or more optics intervene between the pixel and the image detector.

FIG. 3 illustrates an additional configuration for viewing the pixel 200 while the pixel displays the color value 216. In particular, FIG. 3 illustrates an implementation in which optics 302 (e.g., optics 116 of display system(s) 114) intervene between the pixel 200 and the image detector 230. As illustrated in FIG. 3, the light transmitted through the color filters 206 diffracts through the optics 302 toward the image detector 230, and because some of the color filters 206 transmit multiple colors, light received by the optics 302 from one color filter may diffract differently through the optics 302. For example, continuing with the previously noted example where the green filter 226 leaks red light, FIG. 3 shows the green light received by the optics 302 from the green filter 226 may diffract according to solid line 304, whereas red light received by the optics 302 from the green filter 226 may diffract according to dashed line 306. Similarly, where the blue filter 228 leaks green light, FIG. 3 shows the blue light received by the optics 302 from the blue filter 228 may diffract according to solid line 308, whereas green light received by the optics 302 from the blue filter 228 may diffract according to dashed line 310.

Such diffraction may cause light leakage through the color filters 206 to result in image ghosting artifacts that are observable by users viewing the pixel 200 while the pixel displays the color value 216. To illustrate, FIG. 3 shows the image detector 230 observing/detecting the test image 312, which includes a representation 314 of the pixel 200 displaying the color value 216. As is evident from FIG. 3, the representation 314 of the pixel 200 displaying the color value 216, as captured/observed within the test image 312, includes ghosting artifacts represented by multiple offset circles representing different portions of the light emitted by the pixel 200 (e.g., a primary representation, as well as a red ghosting artifact and a green ghosting artifact).

Similar to the implementation described hereinabove with reference to FIG. 2, the representation 314 of the pixel 200 displaying the color value 216 may be associated with an image color value 236 that differs from the color value 216 initially provided to the pixel 200 for display. However, in view of the ghosting described above, FIG. 3 illustrates the red value 238 and the green value 240 of the image color value 236 as being based on multiple portions of the representation 314 of the pixel 200 captured/observed within the test image 312.

Accordingly, at least some implementations of the present disclosure are directed to using a light leak value to compensate or correct for light leakage associated with color filters 206 of a display system 114. In some instances, compensating or correcting for light leakage according to the present disclosure may at least partially address color tinting and/or ghosting issues that may otherwise be present in images displayed by display devices.

Figure 4:
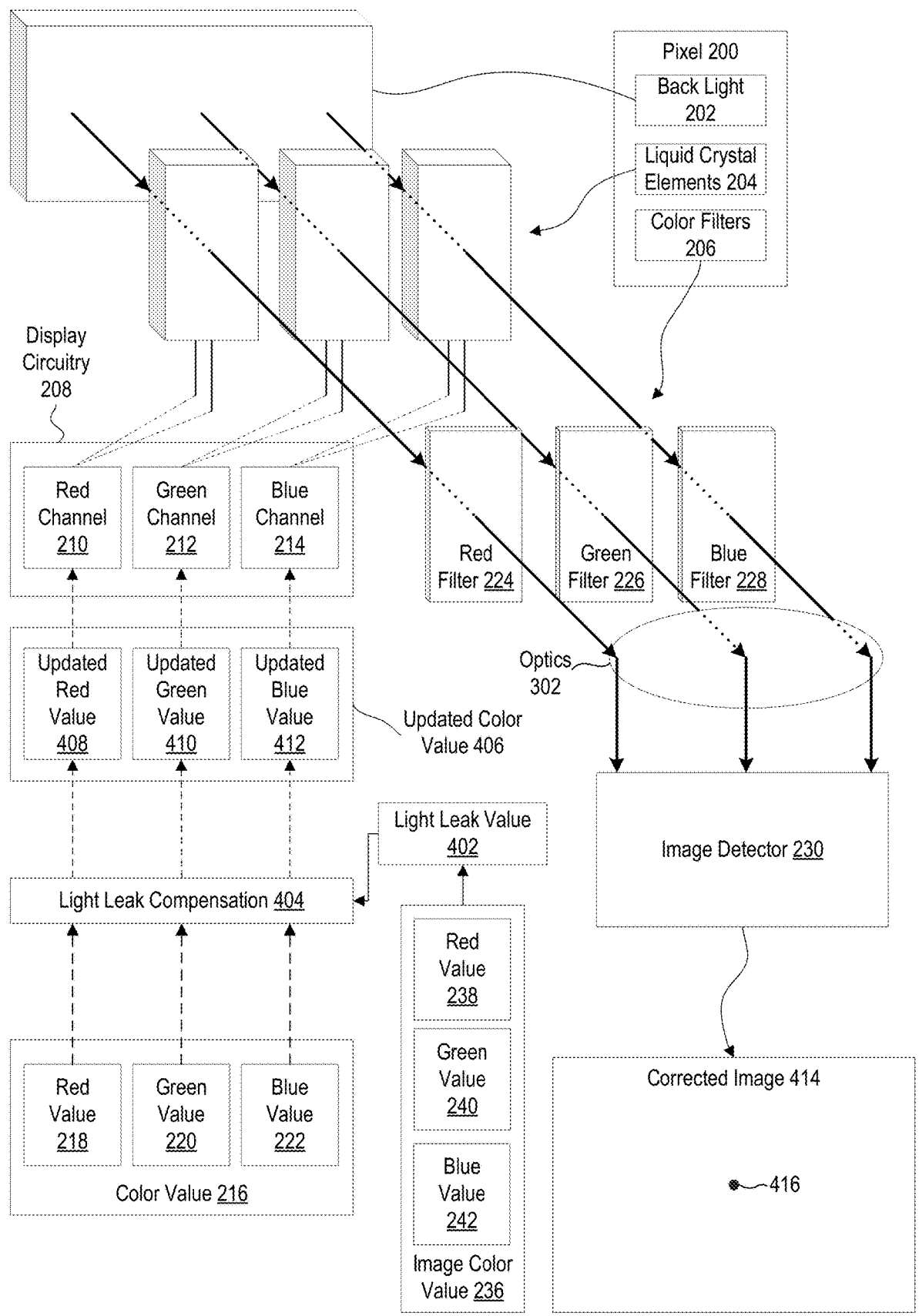
FIG. 4 illustrates an example of using a light leak value to correct for light leakage associated with color filters of a pixel.

FIG. 4 illustrates an example of using a light leak value 402 to correct for light leakage associated with color filters 206 of the pixel 200. The light leak value may be based on a measured light leakage associated with one or more of the color filters 206 of a display system 114 configured to present or display the pixel 200 according to various color values 216. For example, for a color filter associated with a particular color or color channel, the light leak value may represent a percentage of colored light transmitted through the color filter that is associated with a leaking color or color channel that is different than the particular color or color channel.

For instance, continuing with the above example where the green filter 226 leaks red light, the light leak value 402 may comprise an indication of a percentage of light transmitted through the green filter 226 that constitutes red light. Similarly, continuing with the above example where the blue filter 228 leaks green light, the light leak value 402 may comprise an indication of a percentage of light transmitted through the blue filter 228 that constitutes green light. In this regard, a light leak value may comprise various components associated with different colors/color channels.

A light leak value 402 may be obtained for use to correct or compensate for light leakage in various ways. For example, FIG. 4 illustrates an arrow extending from an image color value 236 toward the light leak value 402, indicating that, in some instances, one or more components of a light leak value 402 are based on one or more components of an image color value 236. As indicated hereinabove, the image color value 236 may be determined based on a test image 232 or 312 as described hereinabove referring to FIGS. 2 and 3, respectively.

It should be noted that a test image 232 or 312 that gives rise to an image color value 236 may take on various forms, such as, by way of non-limiting example, an RGB image or a grayscale image (e.g., a grayscale image representative of a particular color channel). Furthermore, although FIGS. 2 and 3 depict implementations in which the test images 232 and 312 capture a representation of a single pixel 200, those skilled in the art will recognize, in view of the present disclosure, that a test image may capture any number of pixels.

Still furthermore, although FIGS. 2 and 3 depict implementations in which the test images 232 and 312 capture a pixel 200 that is displaying a color value 216 that includes a combination red light, green light, and blue light, it will be appreciated, in view of the present disclosure, that a test image may capture one or more pixels configured to display a color value that only includes red light, green light, or blue light in order to measure light leakage for separate red, green, and blue color filters in a focused manner.

In some implementations, using test image 232 from FIG. 2 as an example, a light leak value 402 is determined based on a test image of a pixel 200 (or more than one pixel) without any optics intervening between the pixel 200 and the image detector 230 that captures the pixel 200. An image color value 236 may be obtained based on the test image 232. In some instances, the image color value 236 is calibrated or modified as needed such that the image color value 236 would predictably or directly correspond to the color values 216 provided to the pixel 200 for display thereby in the absence of light leakage. A comparison may be made between the image color value 236 and the color value 216 provided to the pixel 200 for display to determine a light leakage value 402 associated with one or more of the color filters 206 of the pixel 200. Such a comparison may be effectuated in various ways, such as by converting to color space and measuring Euclidean distance, converting to grayscale and utilizing principal component analysis, color histogram analysis (whether RGB or grayscale), artificial-based techniques, and/or others.

Based on a determined color difference between the image color value 236 and the color value 216, a light leakage value 402 may be determined or generated. As noted above, the light leakage value 402 may represent a percentage of light transmitted through a particular color filter that is associated with a color or color channel that is different than the particular color or color channel that the particular color filter is configured or intended to transmit.

Additionally, or alternatively, using test image 312 from FIG. 3 as an example, a light leak value 402 is determined or refined based on a test image of a pixel 200 (or more than one pixel) with optics 302 intervening between the pixel 200 and the image detector 230 that captures the pixel 200. As noted above, the optics 302 may cause image ghosting that is perceptible in test images (e.g., test image 312). A plurality of pixels of a display panel may be configured to display a test pattern (e.g., a series of parallel lines of a single color) with all other color values for other pixels set to zero (e.g., black). The pixels of the display panel may present the test pattern, and light emitted by the display panel may be refracted through optics toward an image detector. The image detector may observe or capture a test image, and an analysis of the test image may be performed to determine the existence of image pixels with nonzero image color values in regions of the test image that deviate from expected diffraction patterns (e.g., based on the properties of the optics for diffracting the particular color of the parallel lines of the test pattern). The image color values for one or more pixels in such regions may be quantified (e.g., by averaging or other techniques), and these image color values may be used as a basis for determining or refining a light leak value 402.

In some instances, a light leak value 402 may depend on a brightness of light displayed by a pixel 200. For example, a green filter 226 may leak a first amount of red light under first brightness conditions but may leak a greater amount of red light under greater brightness conditions. In this regard, in some instances, a light leak value 402 for a color filter of a pixel may be at least partially based on a brightness of light transmitted through the color filter.

Test images for determining a light leak value 402 may be obtained or observed under a variety of circumstances and/or in a variety of ways. For example, an image detector 230 for capturing test images may be used during calibration of a display system 114 to capture test images from an expected perspective of a user of the display system 114 to generate light leak values 402 to calibrate the display system 114 (or a class of display systems of which the display system 114 is a part). In some instances, the test images are specifically captured for light leak correction purposes, while in other instances, the test images may already exist from other calibration steps for calibrating a display system 114 (e.g., display panel distortion calibration to account for optics 116 of a display system 114).

In other examples, an image detector 230 for capturing test images may be implemented as an on-device sensor, such as a camera mounted to a display system 114 to capture one or more pixels of a display panel of the display system 114 to measure light leakage associated with color filters of the display system 114. Such a camera may be arranged to capture light directly from the display panel or arranged to capture light refracted through the optics 116 of the display system 114, or multiple cameras may be used from different positions. Under such configurations, test images may be captured to obtain updated light leak values 402 for the display panel of the display system 114 (e.g., even after initial calibration of the display system 114). For example, such a camera may be used during user-initiated or user-directed calibration processes or may be used during automated calibration processes (e.g., calibration processes interleaved with user experiences).

Accordingly, a light leak value 402 may be determined based at least in part on one or more image color values 236 present in a test image (e.g., test image 232 or 312). The light leak value 402 may be used as an input for correcting or compensating for light leakage associated with one or more color filters 206 of one or more pixels 200 of a display system 114 (e.g., to remove color tinting or image ghosting artifacts).

For example, the light leak value 402 may be used as an input for generating, updating, or modifying subsequent color values for display through one or more color filters 206 of the pixel 200 (or other pixels) of a display system 114. FIG. 4 illustrates the color value 216 comprising a red value 218, a green value 220, and a blue value 222, as before. FIG. 4 also illustrates, by dashed arrows extending from the components of the color value 216, that a light leak compensation operation 404 may be performed to generate an updated color value 406 based on the color value 216 and for display by the pixel 200 (e.g., via display circuitry 208, liquid crystal elements 204, and color filters 206, as described hereinabove).

In some implementations, a light leak compensation operation 404 generates the updated color value 406 by modifying the color value 216 to reduce one or more component values thereof to compensate for light that will be leaked through one or more color filters 206 of the pixel 200. In general terms, a light leak compensation operation 404 may include (1) calculating a product of (i) a light leak value 402 for a particular color and (ii) the component of the color value 216 associated with the color filter that leaks the particular color, and (2) subtracting the product from the component of the color value 216 of the particular color.

As an illustrative example, a light leak value 402 may indicate that the green filter 226 of the pixel 200 leaks 5% red light, and the blue filter 228 of the pixel 200 leaks 4% green light when the pixel 200 is configured to display a (199, 99, 199) color value 216 according to the RGB color model (i.e., (red brightness, green brightness, blue brightness)). Without compensating for light leakage, the pixel 200 may appear to an image sensor or user as though it is displaying a (204, 107, 199) color value, and ghosting may occur where optics intervene.

Thus, a light leak compensation operation 404 may be performed on the red value 218 and the green value 220 of the color value 216 to generate an updated red value 408 and an updated green value 410 for an updated color value 406 for display by the pixel 200 to compensate for light leakage. For example, to determine the updated red value 408, a product of the red light leak value of 5% and the green value 220 (e.g., according to the color filter that leaks red light) may be calculated, corresponding to 5 brightness values on the RGB scale. This product may be subtracted from the red value 218 to provide an updated red value 408 to reduce the brightness of the red channel for the updated color value 406 in a manner that compensates for the red light that will be leaked through the green filter 226. According to the above example, this subtraction may provide an updated red value 408 of (194) for the updated color value 406.

Furthermore, to determine the updated green value 410, a product of the green light leak value of 4% and the blue value 222 (e.g., according to the color filter that leaks green light) may be calculated, corresponding to 8 brightness values on the RGB scale. This product may be subtracted from the green value 220 to provide an updated green value 410 to reduce the brightness of the green channel for the updated color value 406 in a manner that compensates for the green light that will be leaked through the blue filter 228. According to the above example, this subtraction may provide an updated green value 410 of (91) for the updated color value 406.

Accordingly, the light leak compensation operation(s) 404 may provide an updated color value 406 of (194, 91, 199) according to the RGB color model. A system may trigger display of the pixel 200 using the updated color value 406. This updated color value 406 may be written to a frame buffer and provided to or obtained by the display circuitry 208 for display according to the various color channels (e.g., the red channel 210, the green channel 212, and the blue channel 214). Current may be applied through the corresponding liquid crystal elements 204 according to the various color channels, and light may be transmitted through the color filters 206 of the pixel 200.

Light leakage will still occur through the various color filters 206. For instance, according to the above example, the green filter 226 will leak 5 brightness values of red light (for a 5% red component of the light leak value 402) and the blue filter 228 will leak 8 brightness values of green light (for a 4% green light component of the light leak value 402). These leaked brightness values will, in effect, be added to the perceived RGB value displayed by the pixel 200, resulting in an apparent RGB value of (199, 99, 199), which corresponds to the color value 216 described according to the above example. In this way, the updated color value 406 may cause the pixel 200 to display a final apparent RGB value that corresponds to an originally intended RGB value (i.e., corresponding to the color value 216), despite light leakage that will occur through the color filters 206 of the pixel 200.

Light leak correction techniques of the present disclosure may ameliorate color tinting and/or image ghosting that may otherwise occur when a pixel displays uncompensated color values. For instance, FIG. 4 shows the pixel 200 transmitting light through the color filters 206 toward the optics 302. The light propagating from color filters 206 provides the final color value observed from the pixel 200, and this final color value may correspond to the initial or desired color value 216, despite any light leakage that may have occurred through the color filters 206 (e.g., because the pixel 200 emits light according to the updated color value 406). Thus, the light from the pixel 200 may avoid being refracted through the optics 302 in an undesired manner, causing, for example, an image detector 230 to capture a corrected image 414 that includes a representation 416 of the pixel 200 that provides an image color value that corresponds to the initial or desired color value 216.

As is evident in view of the foregoing, a light leak value 402 may depend, at least in part, on characteristics of the various color filters 206 of the pixel 200. In some instances, the color filters of multiple pixels within the same display system 114 have similar characteristics, such that the same or a substantially similar light leak value 402 may be applied to multiple pixels of the same display system 114 to facilitate light leak correction. For example, the light leak compensation operation 404 may be applied to a separate color value for a separate pixel of a display panel (e.g., separate from pixel 200) to generate a separate updated color value for the separate pixel. Display of this separate updated color value on the separate pixel may then be triggered to facilitate light leak correction for the separate pixel.

Furthermore, classes or types of display systems may comprise color filters that have similar characteristics, such that a light leak value 402 may be applied to pixels of multiple display systems of the same type or class.

In contrast, in some instances, some pixels within a same display system 114 may have color filters that have different characteristics. In such instances, separate light leak values may be obtained and used in separate light leak compensation operations for each respective pixel with different color filter characteristics.

Although the present disclosure focuses, in at least some respects, on implementations in which a single test image (e.g., test image 232 or 312) is used to determine a light leak value (e.g., light leak value 402), multiple test images may be analyzed to determine a light leak value. For example, test images may be captured sequentially or iteratively. In some implementations, each test image may be captured while pixels are illuminated using a different light leak compensation operation relying on a different test light leak value of a first set of test light leak values.

The test images may be assessed to determine a particular test light leak value that resulted in a test image that had a lowest amount of color tinting or image ghosting. In some instances, a second set of test images may then be captured using a second set of test light leak values centered about the particular test light leak value mentioned above, with finer differences between different test light leak values of the second set of test light leak values. A second particular light leak value may be selected based on an analysis of the second set of test images. Additional sets of test images may be acquired in like manner according to a desired level of precision or granularity.

Other iterative approaches may be employed to determine a light leak value. For example, after analyzing a first test image, an incremental change may be made to a test light leak value used to capture the first test image. A second test image may then be captured using the updated test light leak value, and an amount of color tinting or image ghosting present within the second test image may be compared to those of the first test image. Based on the analysis, the test light leak value may be updated again and a subsequent test image may be captured and analyzed, and so forth until light leakage artifacts are determined to be minimized (e.g., incremental changes in test light leak values fail to provide an improvement to detected artifacts).

Any techniques for determining a light leak value described hereinabove may be facilitated using any type of artificial intelligence. Furthermore, in some instances, a light leak value for a particular pixel, set of pixels, display panel, or class/type of display panels may be determined based at least in part on user input. For example, whether in a factory or end user setting, a system 100 may utilize a display system 114 that includes a display panel to display a color value using a color filter of a pixel. A user operating the display system 114 may then assess an amount of light leak (e.g., by subjectively assessing color tint and/or image ghosting present).

Based on the assessment, the user may provide user input establishing or modifying a light leak correction parameter (e.g., a light leak value). The system 100 may receive the user input and use the light leak correction parameter as an input for generating a modified color value for the pixel. The system 100 may then trigger display of the modified color value using the color filter of the pixel. The user may then assess the modified presentation of the pixel. Based on the assessment, the user may provide user input that modifies or updates the light leak correction parameter, or, alternatively, provide user input confirms the light leak correction parameter (as most recently modified or established) as sufficiently correcting for light leakage associated with the color filter of the pixel. The system 100 may receive this user input and define a light leak value based on the most recently modified or updated light leak correction parameter.

Although the present disclosure focuses, in at least some respects, on facilitating light leak correction by applying a light leak compensation operation 404 to generate an updated color value and writing the updated color value to a final frame buffer (e.g., by a GPU), a light leak compensation operation may take on other forms within the scope of this disclosure. For instance, a light leak compensation operation may comprise any process that uses a light leak value to effectuate a modification to a final apparent color value provided by a pixel. For instance, a light leak compensation operation may be implemented in firmware or hardware of a display system 114 itself. A light leak compensation operation may even be implemented as a subtractive filter provided between color filters 206 of a pixel 200 and an image detector 230 configured to selectively subtract out an amount of light in accordance with a light leak value 402.

It should be noted that, although the present disclosure focuses, in at least some respects, on applying a light leak compensation operation to modify a color value for display by a pixel, a light leak compensation operation may be applied in other contexts.

For example, in some alternative embodiments, an image sensor includes one or more filters disposed thereover (e.g., filters for filtering light of wavelengths within the visible spectrum, and/or filters configured to filter light of wavelengths outside of the visible spectrum). Imperfections in such filters may cause the filters to leak light in an unintended or undesired manner, which may cause color tinting in image data captured by the image sensor. Thus, in some implementations, a light leak compensation operation may be applied to modify image data captured by an image sensor that captures light transmitted through a filter to compensate for any such imperfections and leaking light from the filer(s).

In some alternative embodiments, methods and systems are provided for compensating for light leakage associated with cameras or other sensors that have filters that leak light. In such embodiments, the disclosed methods include an act of obtaining an image captured using an image sensor, the image sensor capturing light transmitted through a filter, the image comprising a plurality of pixels, each pixel comprising image data representative of the light transmitted through the filter. Then, the disclosed methods further include obtaining a light leak value associated with the filter, the light leak value being based on a measured light leakage associated with the filter. This act can be performed according to the various techniques described throughout this disclosure. Thereafter, the light leak value is used as an input for modifying at least some of the image data of the plurality of pixels to compensate for the measured light leakage associated with the filter.

Further, in some instances, it is noted that the filter that leaks light may be specifically configured to transmit light associated with a particular set of wavelengths (e.g., wavelengths corresponding to distinct spectrums of light, such as Red, Green, Blue, Infrared, Ultraviolet, and/or a combination of light spectrums). When the filter is configured to transmit light of a particular set of wavelengths, the light leak value comprises a percentage of light transmitted through the filter that is associated with one or more wavelengths outside of the particular set of wavelengths.

Additionally, the light leak value may further be used as an input for modifying at least some of the image data of the plurality of pixels by modifying one or more image data components associated with the one or more wavelengths outside of the particular set of wavelengths based on the light leak value.

Example Method(s) for Light Leak Correction The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
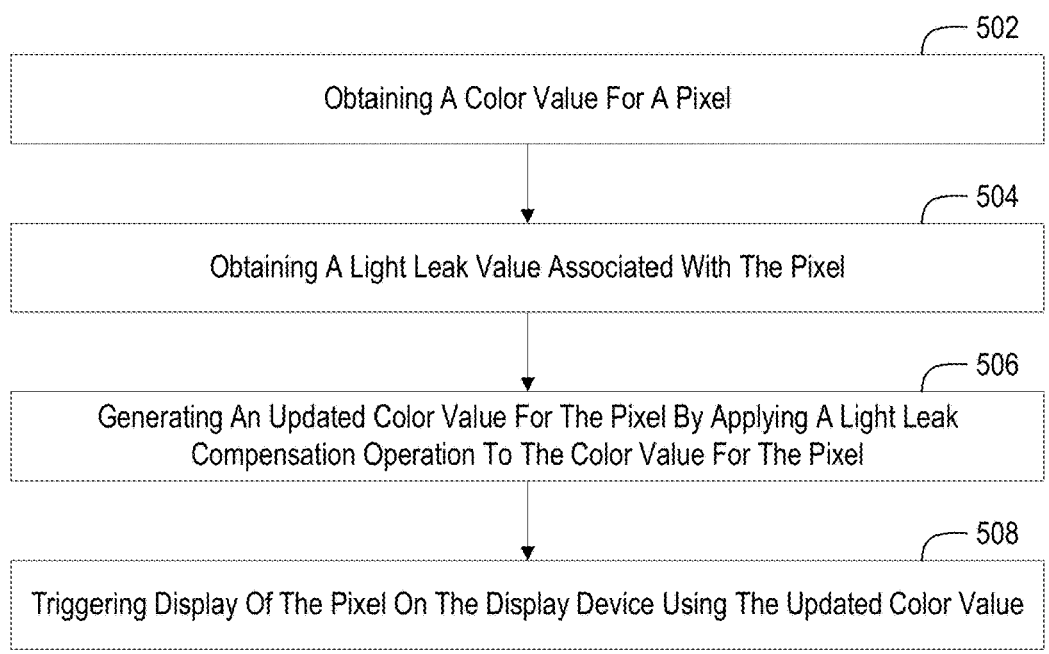
FIGS. 5-7 illustrate example flow diagrams depicting acts associated with facilitating light leak correction for a display device.
Figure 6:
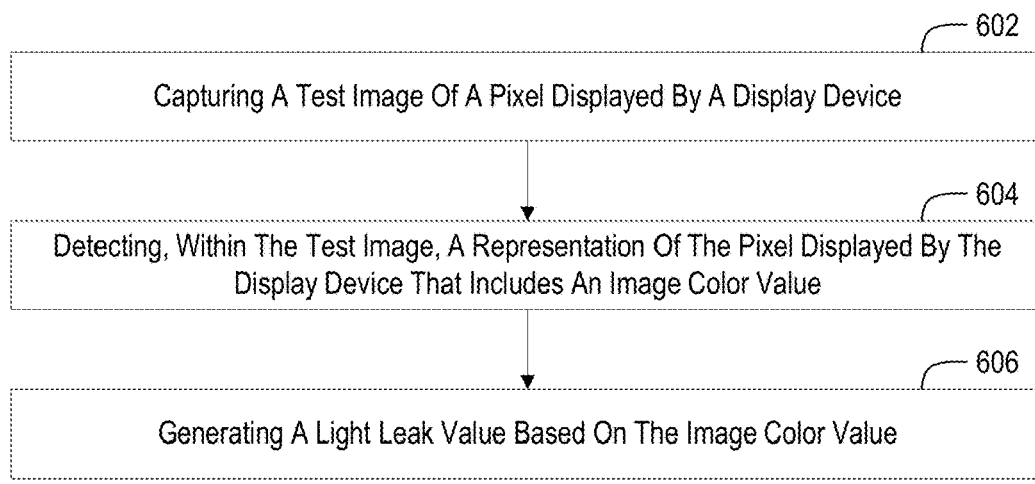
Figure 7:
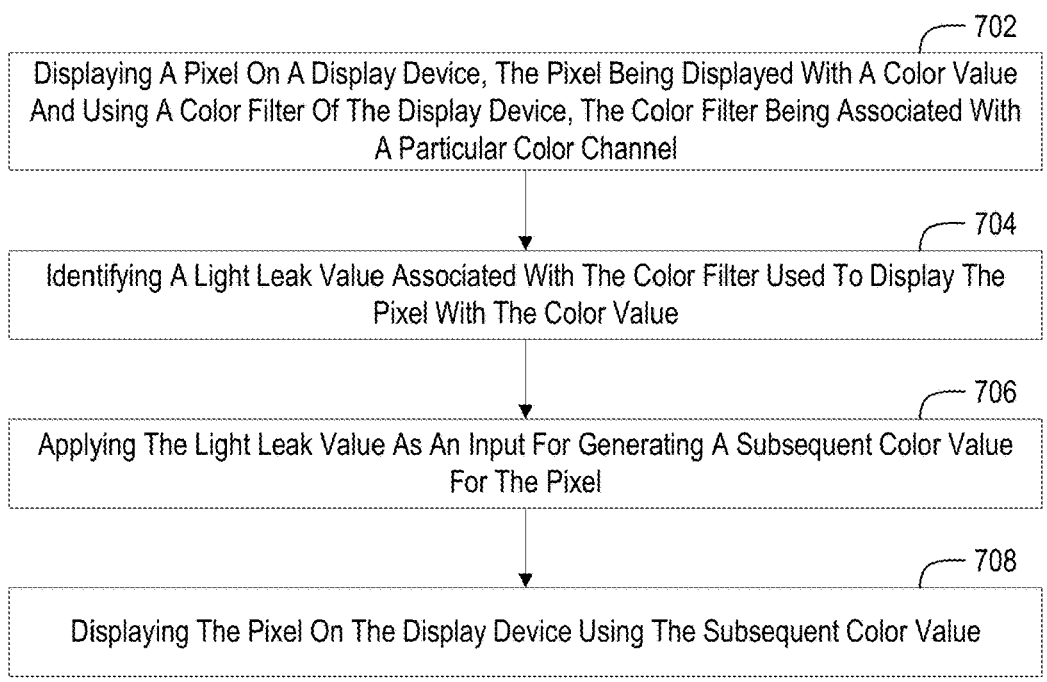

FIGS. 5, 6, and 7 illustrate example flow diagrams 500, 600, and 700, respectively, which depict acts associated with facilitating light leak correction for one or more display devices. The discussion of the various acts represented in the flow diagrams include references to various hardware components described in more detail with reference to FIG. 1.

Act 502 of flow diagram 500 includes obtaining a color value for a pixel. Act 502 is performed, in some instances, by a system 100 utilizing processor(s) 102, sensor(s) 110, I/O system(s) 112, storage 104, and/or communication system(s) 118. In some instances, the color value for the pixel may comprise at least three components representing, respectively, at least three different color channels. Each different color channel may be associated with a different color filter of a display device (e.g., display system(s) 114) configured to display the pixel.

Act 504 of flow diagram 500 includes obtaining a light leak value associated with the pixel. Act 504 is performed, in some instances, by a system 100 utilizing processor(s) 102, sensor(s) 110, I/O system(s) 112, storage 104, and/or communication system(s) 118. In some implementations, the light leak value is based on a measured light leakage associated with a color filter of a display device configured to display the pixel. For example, for a particular color channel of the pixel, the light leak value may be based on a percentage of colored light transmitted through a particular color filter of the display device configured to transmit light for the particular color channel, where the colored light corresponds to a color channel that is different than the particular color channel. Furthermore, in some instances, the light leak value is based on a brightness associated with the pixel.

The light leak value may be a predetermined light leak value (e.g., determined for another display device or during calibration). In some implementations, the light leak value may be a dynamically obtained light leak value. For instance, the light leak value may be obtained by utilizing a sensor to measure light leakage associated with a color filter of the display device configured to display the pixel, and by generating the light leak value based on the measured light leakage.

Act 506 of flow diagram 500 includes generating an updated color value for the pixel by applying a light leak compensation operation to the color value for the pixel. Act 506 is performed, in some instances, by a system 100 utilizing processor(s) 102 and/or storage 104. In some instances, the light leak compensation operation uses the light leak value as an input for modifying the color value to compensate for light leakage that may otherwise occur when displaying the pixel on the display device.

For example, generating an updated color value may include (1) calculating a product of (i) the percentage of the colored light transmitted through a particular color filter that corresponds to a color channel that is different than the particular color channel intended for transmission by the particular color filter and (ii) the component of the color value associated with the particular color channel intended for transmission by the particular color filter, and (2) subtracting the product from the component of the color value for the pixel associated with the color channel that is different than the particular color channel (i.e., the color that leaks through the particular color filter).

Act 508 of flow diagram 500 includes triggering display of the pixel on the display device using the updated color value. Act 508 is performed, in some instances, by a system 100 utilizing processor(s) 102, I/O system(s) 112, storage 104, and/or communication system(s) 118. For example, in some instances, triggering display of the pixel on the display device using the updated color value includes writing the updated color value to a frame buffer for display by the display device.

Act 602 of flow diagram 600 includes capturing a test image of a pixel displayed by a display device. Act 602 is performed, in some instances, by a system 100 utilizing processor(s) 102, sensor(s) 110, I/O system(s) 112, storage 104, and/or communication system(s) 118. For example, the test image may be captured by an image detector of a system 100. The test image may capture the display device (e.g., display system 114) while the display device is displaying the pixel using a particular color value. The particular color value may include at least three component values associated, respectively, with at least three different color channels, where each different color channel is associated with a different color filter of the display device. In some instances, one or more optics intervene between the image detector and the display device.

Act 604 of flow diagram 600 includes detecting, within the test image, a representation of the pixel displayed by the display device that includes an image color value. Act 604 is performed, in some implementations, by a system 100 utilizing processor(s) 102, sensor(s) 110, I/O system(s) 112, storage 104, and/or communication system(s) 118. In some instances, the image color value may represent component values that differ from corresponding component values for the pixel displayed by the display device.

Act 606 of flow diagram 600 includes generating a light leak value based on the image color value. Act 606 is performed, in some instances, by a system 100 utilizing processor(s) 102, sensor(s) 110, I/O system(s) 112, storage 104, and/or communication system(s) 118. In some instances, the light leak value is based on a brightness associated with the pixel displayed by the display device. The light leak value may be used to adjust subsequent color values for display on one or more display devices.

In some implementations, the test image referred to according to act 602 captures a plurality of pixels displayed by a display device. The display device may display each of the plurality of pixels using a separate particular color value for each of the plurality of pixels. A representation of the plurality of pixels displayed by the display device and captured by the test image may include a plurality of image color values, where at least some of the plurality of image color values represent component values that differ from corresponding component values for at least some of the plurality of pixels displayed by the display device. In such implementations, the light leak value referred to according to act 606 may be based on an average of at least some of the plurality of image color values.

Act 702 of flow diagram 700 includes displaying a pixel on a display device, the pixel being displayed with a color value and using a color filter of the display device, the color filter being associated with a particular color channel. Act 702 is performed, in some instances, by a system 100 utilizing processor(s) 102, I/O system(s) 112, storage 104, and/or communication system(s) 118. In some instances, one or more optics intervene between the display device and one or more eyes of a user.

Act 704 of flow diagram 700 includes identifying a light leak value associated with the color filter used to display the pixel with the color value. Act 704 is performed, in some instances, by a system 100 utilizing processor(s) 102, sensor(s) 110, I/O system(s) 112, storage 104, and/or communication system(s) 118. The light leak value may represent a percentage of colored light transmitted through the color filter that is associated with a leaking color channel that is different than the particular color channel.

In some implementations, identifying a light leak value includes various acts, such as receiving user input establishing or modifying a light leak correction parameter, using the light leak correction parameter as an input for generating a modified color value associated with the pixel, displaying the pixel at the display device using the modified color value, receiving user input confirming that modifying the color value associated with the pixel with the light leak correction parameter compensates for light leakage associated with the color filter used by the display device to display the pixel, and defining the light leak value based on the light leak correction parameter.

Act 706 of flow diagram 700 includes applying the light leak value as an input for generating a subsequent color value for the pixel. Act 706 is performed, in some instances, by a system 100 utilizing processor(s) 102, I/O system(s) 112, storage 104, and/or communication system(s) 118. In some instances, the color value comprises multiple components, and each component may be associated with a different color channel. Applying the light leak value as an input for generating a subsequent color value for the pixel may include (1) calculating a product of (i) the light leak value and (ii) a component of the color value associated with a particular color channel, and (2) subtracting the product from a component of the color value associated with the leaking color channel, where the leaking color channel is different than the particular color channel.

Act 708 of flow diagram 700 includes displaying the pixel on the display device using the subsequent color value. Act 708 is performed, in some instances, by a system 100 utilizing processor(s) 102, I/O system(s) 112, storage 104, and/or communication system(s) 118.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g. as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A system for facilitating light leak correction for a display device, comprising:
   a back lit display panel;
   one or more optics configured to refract light emitted from the back lit display panel during end use of the back lit display panel;
   one or more processors; and
   one or more hardware storage devices storing instructions that are executable by the one or more processors to configure the system to facilitate light leak correction for the back lit display panel by configuring the system to:
      obtain a color value for a pixel of the back lit display panel;
      obtain a light leak value associated with the pixel, the light leak value being based on a measured amount of image ghosting artifacts present in a test image captured of light output by the back lit display panel and refracted by the one or more optics, the measured image ghosting artifacts resulting from refraction of the light output by the back lit display panel through the one or more optics;
      generate an updated color value for the pixel by applying a light leak compensation operation to the color value for the pixel, wherein the light leak compensation operation uses the light leak value as an input for modifying the color value to compensate for light leakage that may otherwise occur when displaying the pixel on the back lit display panel; and
      trigger display of the pixel on the back lit display panel using the updated color value.

2. The system of claim 1, wherein the color value for the pixel comprises at least three components representing, respectively, at least three different color channels, and wherein each different color channel is associated with a different color filter of the back lit display panel configured to display the pixel.

3. The system of claim 2, wherein, for a particular color channel of the pixel, the light leak value is based on a test light leak value used to generate the test image, the test light leak value causing the test image to exhibit a predetermined amount of image ghosting artifacts.

4. The system of claim 3, wherein, for the particular color channel of the pixel, applying the light leak compensation operation comprises:
   calculating a product of (i) a component of the test light leak value associated with a color channel that is different than the particular color channel and (ii) the component of the color value associated with the particular color channel; and
   subtracting the product from the component of the color value for the pixel associated with the color channel that is different than the particular color channel.

5. The system of claim 3, wherein the light leak value is based on a brightness associated with the pixel.

6. The system of claim 1, wherein obtaining the light leak value comprises accessing a predetermined light leak value.

7. The system of claim 1, wherein obtaining the light leak value comprises:
   utilizing a sensor to capture the test image, the test image capturing one or more pixels of the back lit display panel after application of a test light leak value to one or more color values of the one or more pixels and after refraction through the one or more optics;
   measuring an amount of image ghosting artifacts present in the test image; and
   based upon the amount of image ghosting artifacts, generating the light leak value based on the test light leak value.

8. The system of claim 7, wherein measuring the amount of image ghosting artifacts present in the test image comprises processing the test image utilizing artificial intelligence.

9. The system of claim 1, wherein triggering display of the pixel on the back lit display panel using the updated color value comprises writing the updated color value to a frame buffer for display by the back lit display panel.

10. The system of claim 1, wherein the instructions are executable by the one or more processors to further configure the system to:
    obtain a separate color value for a separate pixel;
    generate a separate updated color value for the separate pixel by applying the light leak compensation operation to the separate color value for the separate pixel; and
    in addition to triggering display of the pixel on the back lit display panel using the updated color value, trigger display of the separate pixel on the back lit display panel using the separate updated color value.

11. The system of claim 1, wherein the instructions are executable by the one or more processors to further configure the system to:

obtain a separate color value for a separate pixel;
obtain a separate light leak value associated with the separate pixel, the separate light leak value being based on a separate measured amount of image ghosting artifacts present in the test image;
generate a separate updated color value for the separate pixel by applying a separate light leak compensation operation to the separate color value for the separate pixel, wherein the separate light leak compensation operation uses the separate light leak value as an input for modifying the separate color value to compensate for separate light leakage that may otherwise occur when displaying the separate pixel on the back lit display panel; and
in addition to triggering display of the pixel on the back lit display panel using the updated color value, trigger display of the separate pixel on the back lit display panel using the separate updated color value.

12. A system for facilitating light leak correction for a display device, comprising:
a back lit display panel;
one or more optics configured to refract light emitted from the back lit display panel during end use of the back lit display panel;
one or more processors; and
one or more hardware storage devices storing instructions that are executable by the one or more processors to configure the system to facilitate light leak correction for the back lit display panel by configuring the system to:
capture, with an image detector, a test image of a pixel displayed by the back lit display panel, the back lit display panel displaying the pixel using a particular color value, the particular color value comprising at least three component values associated, respectively, with at least three different color channels, wherein each different color channel is associated with a different color filter of the back lit display panel, wherein the one or more optics intervene between the image detector and the back lit display panel;
detect, within the test image, an amount of image ghosting artifacts associated with light of the pixel displayed by the back lit display panel and refracted through the one or more optics, the detected image ghosting artifacts resulting from refraction of the light of the pixel displayed by the back lit display panel through the one or more optics; and
determine a light leak value based on the amount of image ghosting artifacts present within the test image in association with the light of the pixel displayed by the back lit display panel and refracted through the one or more optics, wherein the light leak value is used to adjust subsequent color values for display on one or more display devices.

13. The system of claim 12, wherein the test image captures a plurality of pixels displayed by the back lit display panel, the back lit display panel displaying each of the plurality of pixels using a separate particular color value for each of the plurality of pixels, and wherein the amount of image ghosting artifacts is associated with the plurality of pixels displayed by the back lit display panel.

14. The system of claim 13, wherein the light leak value is based on an average amount of image ghosting artifacts associated with the plurality of pixels displayed by the back lit display panel.

15. The system of claim 12, wherein the light leak value is further based on a brightness associated with the pixel displayed by the back lit display panel.

* * * * *